US012068452B2

(12) United States Patent
Taniuchi et al.

(10) Patent No.: US 12,068,452 B2
(45) Date of Patent: Aug. 20, 2024

(54) SEPARATOR AND SOLID-STATE BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 17/110,272

(22) Filed: Dec. 2, 2020

(65) Prior Publication Data
US 2021/0194048 A1    Jun. 24, 2021

(30) Foreign Application Priority Data

Dec. 18, 2019  (JP) .................................. 2019-228059

(51) Int. Cl.
*H01M 50/463* (2021.01)
*H01M 10/0562* (2010.01)
*H01M 10/0585* (2010.01)

(52) U.S. Cl.
CPC ... *H01M 10/0562* (2013.01); *H01M 10/0585* (2013.01); *H01M 50/463* (2021.01)

(58) Field of Classification Search
CPC ............ H01M 10/613; H01M 10/651; H01M 10/653; H01M 2/02; H01M 2/10;
(Continued)

(56) References Cited

U.S. PATENT DOCUMENTS

| 10,355,304 | B2* | 7/2019 | Karditsas | ............ | H01M 50/291 |
| 2012/0112393 | A1* | 5/2012 | Januma | ................... | F16F 3/023 |
| | | | | | 267/103 |

(Continued)

FOREIGN PATENT DOCUMENTS

| JP | 2015053261 A | 3/2015 |
| JP | 2015232976 A | 12/2015 |

(Continued)

OTHER PUBLICATIONS

Fujiwara et al., Power Storage Device, Jan. 3, 2019, Machine Translation with Original Figures. (Year: 2019).*

(Continued)

*Primary Examiner* — Milton I Cano
*Assistant Examiner* — Joshua P McClure
(74) *Attorney, Agent, or Firm* — CKC & Partners Co., LLC (57) ABSTRACT

To provide a solid-state battery module and a separator which can apply sufficient surface pressure to a solid-state battery cell and are excellent in durability and vibration resistance. A separator (120) disposed between adjacent solid-state battery cells (101) in a solid-state battery module (100) including a plurality of solid-state battery cells (101) to electrically insulate the adjacent solid-state battery cells (101) of the plurality of solid-state battery cells (101), from each other. The separator (120) includes elastically deformable elastic members (123*a*, 123*b*) which apply biasing force in the stacking directions of the plurality of solid-state battery cells (101). Durability and vibration resistance can be obtained by adequately fixing the solid-state battery cells (101) with the elastic members (123*a*, 123*b*).

8 Claims, 6 Drawing Sheets

(58) Field of Classification Search
CPC .......... H01M 50/463; H01M 10/0562; H01M 10/0565; H01M 10/0585
See application file for complete search history.

(56) References Cited

U.S. PATENT DOCUMENTS

2017/0358788 A1* 12/2017 Inoue .................. H01M 50/289
2020/0194753 A1 6/2020 Fujiwara et al.

FOREIGN PATENT DOCUMENTS

| JP | 2016152072 A | 8/2016 |
| JP | 2019102261 A | 6/2019 |
| WO | 2018101079 A1 | 6/2018 |
| WO | 2019003772 A1 | 1/2019 |

OTHER PUBLICATIONS

Moore, G.F. (1997). Electric Cables Handbook (3rd Edition). John Wiley & Sons. (Year: 1997).*
(CRC Handbook of Mechanical Engineering (2nd Edition) © 2004 Taylor & Francis) (Year: 2004).*
Fujiwara et al. (Machine Translation of WO2019003772 A1). Updated Previous Machine Translation to include bibliography and abstract. (Year: 2019).*

* cited by examiner

SEPARATOR AND SOLID-STATE BATTERY MODULE

This application is based on and claims the benefit of priority from Japanese Patent Application No. 2019-228059, filed on 18 Dec. 2019, the content of which is incorporated herein by reference.

BACKGROUND OF THE INVENTION

Field of the Invention

The present invention relates to a separator and a solid-state battery module.

Related Art

In recent years, a technology relating to a solid-state battery using a solid electrolyte, which has a high energy density and high safety against heat has been proposed. When a solid-state battery is used for applications requiring a large current and a high voltage, such as for a motor drive of an electric vehicle or a hybrid electric vehicle, a solid-state battery module modularized by combining a plurality of solid-state batteries is used.

Patent Document 1: Japanese Unexamined Patent Application, Publication No. 2019-102261

Patent Document 1 discloses a configuration in which a laminate constituting a solid-state battery is housed in a laminate film as an exterior packaging body and a plurality of the laminated solid-state batteries are contained to form a battery module.

Solid-state battery modules are required to apply sufficient surface pressure to the batteries to hold the battery cell in a cylindrical, rectangular, laminated, or other type of exterior packaging body, and to avoid degradation of input-output characteristics clue to increased inter facial resistance.

The technology disclosed in Patent Document 1 sandwiches together a plurality of solid-state batteries between plates to pressurize and fix the plurality of solid-state batteries. However, in the technology disclosed in Patent Document 1, since the solid-state batteries are fixed in close contact with one another, the influence of the expansion of the solid-state batteries on the constituent member and the influence of vibration, and the like are not sufficiently considered.

SUMMARY OF THE INVENTION

The present invention has been made in view of the above, and an object of the present invention is to provide a solid-state battery module and a separator which can apply sufficient surface pressure to a solid-state battery cell and are excellent in durability and vibration resistance.

The present invention relates to a separator disposed between adjacent solid-state battery cells in a solid-state battery module including a plurality of solid-state battery cells to electrically insulate the adjacent solid-state battery cells of the plurality of solid-state battery cells, from each other, and the separator includes an elastically deformable elastic member which applies biasing force in a stacking direction of the plurality of solid-state battery cells.

The separator preferably forms a gap between the adjacent solid-state battery cells of the plurality of solid-state battery cells.

It is preferable that the separator includes a body including the elastic member and a fixing part, that the fixing part is disposed at least above the body, and that the fixing part regulates movement of the body by a predetermined amount or more.

Further, the present invention relates to a solid-state battery module including the separator. The plurality of solid-state battery cells includes a laminate including a positive electrode layer, a negative electrode layer, and a solid electrolyte layer present between the positive electrode layer and the negative electrode layer. A laminating direction of the laminate and the stacking direction of the plurality of solid-state battery cells are the same.

In the solid-state battery module, the plurality of solid-state battery cells preferably includes a pressing part that applies surface pressure to a surface substantially perpendicular to the laminating direction of the laminate.

In the solid-state battery module, it is preferable that bind bars or end plates are disposed at both ends of the plurality of solid-state battery cells, and that an end separator including an elastically deformable elastic member which applies biasing force in the stacking direction of the plurality of solid-state battery cells is disposed between each end of the plurality of solid-state battery cells and the bind bar or the end plate.

According to the present invention, it is possible to provide the solid-state battery module and the separator which can apply sufficient surface pressure to a solid-state battery cell and are excellent in durability and vibration resistance.

DETAILED DESCRIPTION OF THE INVENTION

Embodiments of the present invention will be described below with reference to the drawings.
Please note that the embodiments shown below illustrate the present invention, and the present invention is not limited to the following.

Solid-State Battery Module

Figure 1:
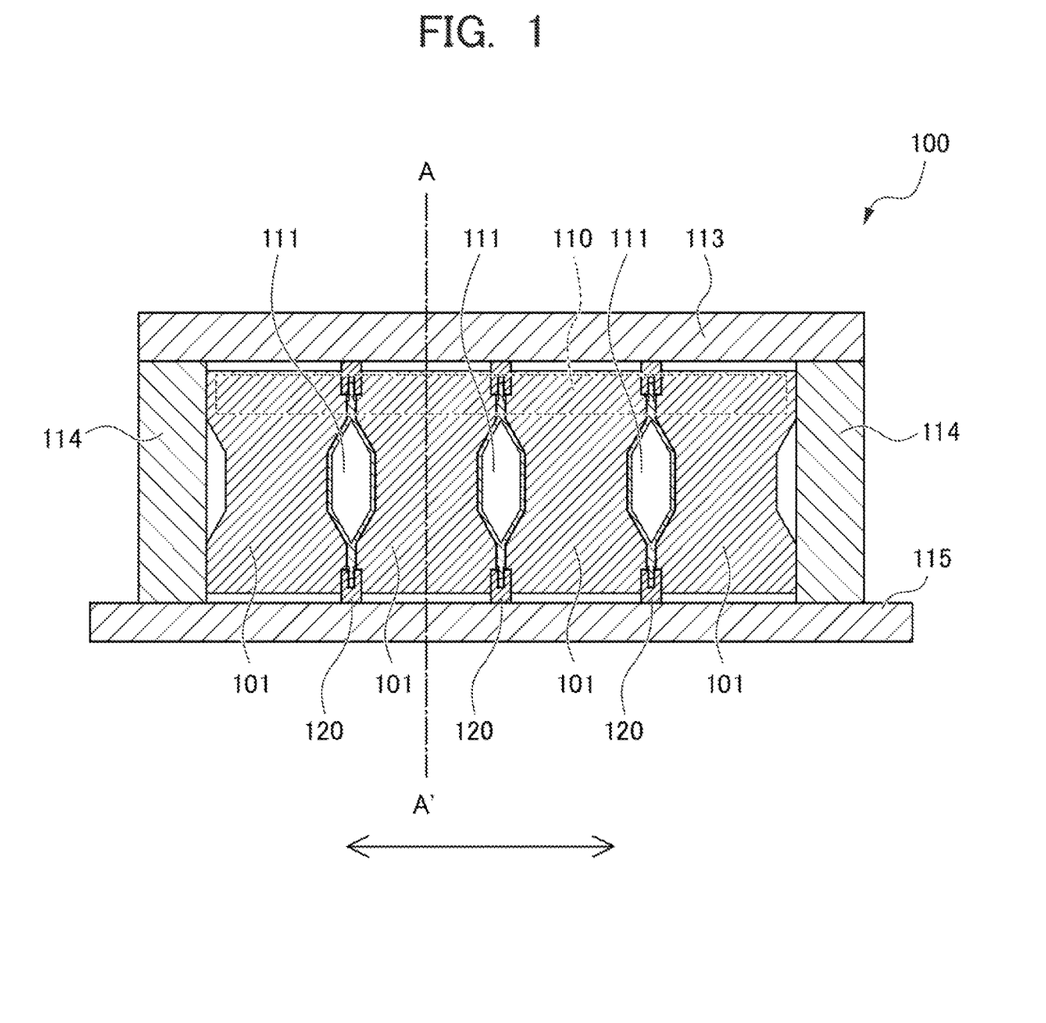
FIG. 1 is a cross-sectional view of a solid-state battery module according to an embodiment of the present invention.

A solid-state battery module 100 includes a plurality of solid-state battery cells 101.
FIG. 1 is a cross-sectional view showing the configuration of the solid-state battery module 100.
The plurality of solid-state battery cells 101 is disposed in the stacking directions shown by an arrow in FIG. 1.

Separators 120 are respectively disposed between adjacent solid-state battery cells of the plurality of solid-state battery cells 101.

A gap 111 is formed in the separator 120.

At the top of the plurality of solid-state battery cells 101, a module constituent member 110 is disposed.

In addition to the above, the solid-state battery module 100 includes a top cover 113, bind bars 114, and a lower plate 115.

Solid-State Battery Cell

Figure 2:
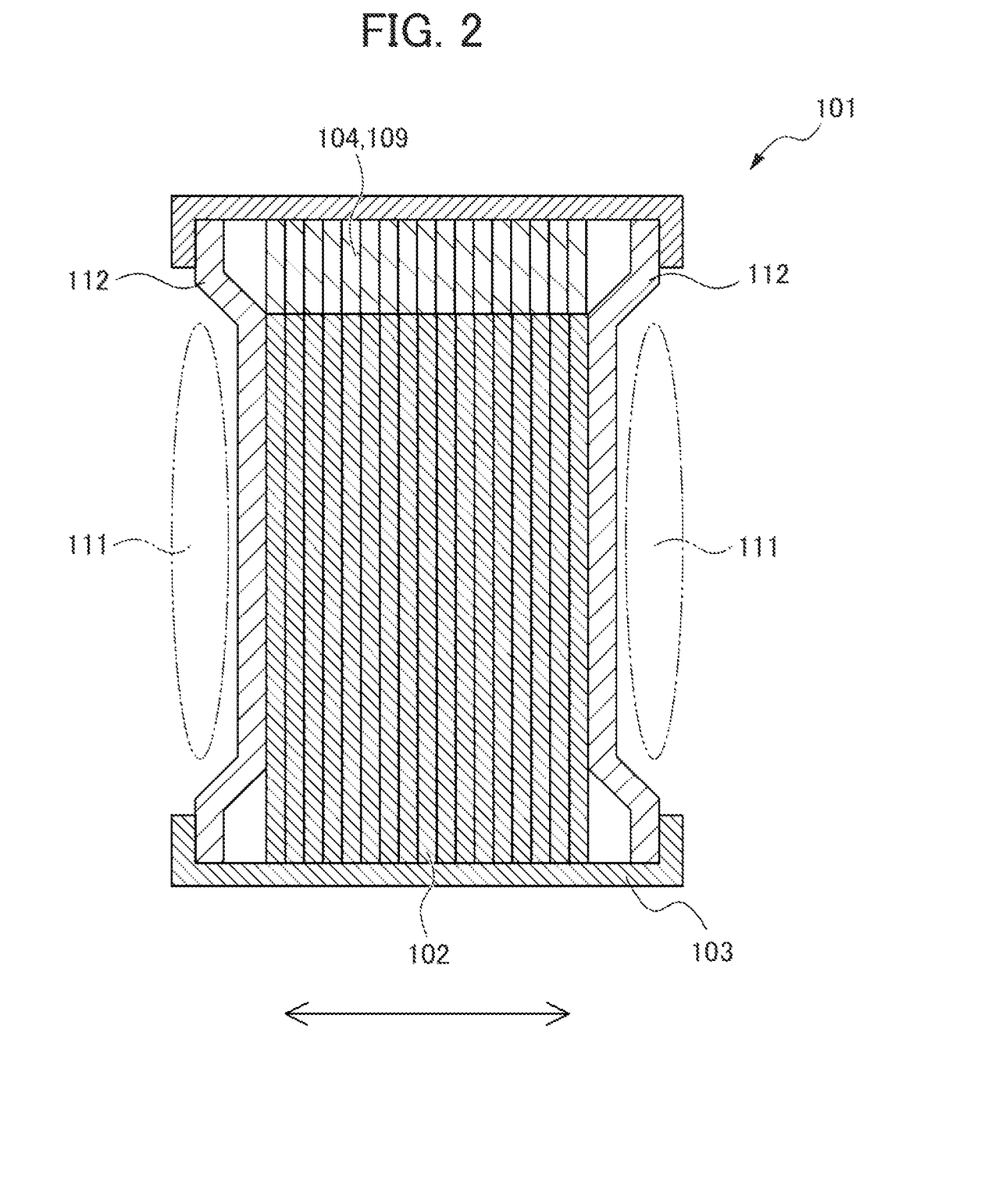
FIG. 2 is a cross-sectional view of a solid-state battery cell according to the embodiment of the present invention.

The solid-state battery cell 101 includes a laminate 102 including a positive electrode layer, a solid electrolyte layer, and a negative electrode layer, and a battery case 103.

FIG. 2 is a cross-sectional view showing the configuration of the solid-state battery cell 101.

The laminate 102 is housed in the battery case 103.

The battery case 103 includes a pressing part 112.

A positive electrode tab 104 and a negative electrode tab 109, which are connected to the laminate 102, extend from the upper end of the laminate 102.

The laminate 102 includes a positive electrode layer, a negative electrode layer, and a solid electrolyte layer present between the positive electrode layer and the negative electrode layer (not shown). The positive electrode layer and the negative electrode layer are composed of, for example, an electrode material (active material) and a current collector made of a metal foil or the like.

The positive electrode layer is electrically connected to the positive electrode tab 104, and the negative electrode layer is electrically connected to the negative electrode tab 109.

The positive electrode material and the negative electrode material used in the positive electrode layer and the negative electrode layer are not particularly limited, and known materials used in the positive electrodes and the negative electrodes of solid-state batteries are used.

The positive electrode material and the negative electrode material contain a solid electrolyte and an active material. In addition to the above, the positive electrode material and the negative electrode material may contain an electroconductive auxiliary agent, a binder, and the like.

The solid electrolyte used in the solid electrolyte layer is not particularly limited, and a known solid electrolyte such as an oxide-based solid electrolyte or a sulfide-based solid electrolyte is used, for example.

The solid electrolyte may contain a binder or the like, if necessary. The laminating directions of the laminate 102 shown by an arrow in FIG. 2 and the stacking directions of the solid-state battery cells 101 shown by an arrow in FIG. 1 are the same.

The battery case 103 is a container that houses the laminate 102. The battery case 103 includes the pressing part 112, as shown in FIG. 2.

The material of the battery case 103 is not particularly limited, but is preferably metal.

When the battery case 103 is metal, the heat dissipation property is improved, and the strength of the battery case 103 itself is also improved.

Further, the sealing property can be improved because metal welding is possible.

The outer shape of the battery case 103 can be made to conform to the outer shape of the laminate 102.

This enables the volume of the solid-state battery to be reduced and the energy density to be improved.

Figure 3:
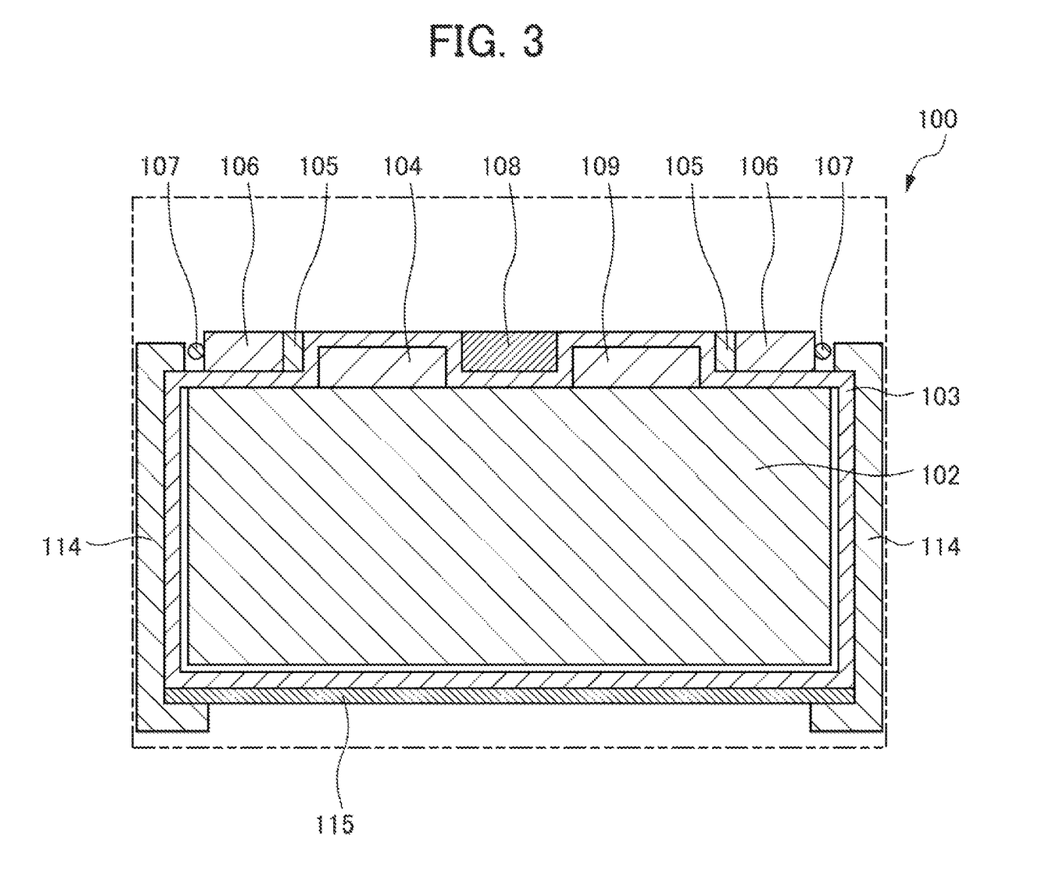
FIG. 3 is a cross-sectional view of the solid-state battery module according to the embodiment of the present invention taken along the line A-A' of FIG. 1.

FIG. 3 is a cross-sectional view taken along the line A-A' of FIG. 1. As shown in FIG. 3, the battery case 103 is formed along the outer shape of the laminate 102 and includes convex parts for storing the positive electrode tab 104 and the negative electrode tab 109. Further, a concave part is formed by the convex parts at the top of the battery case 103. A thermistor 108 or the like as the module constituent member 110 may be disposed in the concave part.

The pressing part 112 is constituted, for example, by an elastic member such as a spring, to apply surface pressure to the laminate 102 by an elastic force.

The pressing parts 112 apply surface pressure in the laminating directions of the laminate 102 including the positive electrode layer, the negative electrode layer, and the solid electrolyte layer, which is indicated by an arrow in FIG. 2. Thus, it is possible to apply an initial load to the laminate 102, and to improve the input-output, characteristics and vibration resistance of the solid-state battery.

The pressing part 112 is provided on a surface substantially perpendicular to the laminating directions of the laminate 102.

The pressing part 112 is preferably provided on, for example, a pair of opposed surfaces of the battery case 103, but may be provided on only one surface of one side of the battery case 103.

The structure of the pressing part 112 is not particularly limited as long as it can apply surface pressure to the laminate 102, and examples thereof include a stepped shape, a corrugated shape, and a shape composed of a curved surface.

The pressing part 112 may be continuous with the battery case 103, but is preferably formed as a member discontinuous with the battery case 103.

As shown in FIG. 2, the pressing part 112 according to the present embodiment is formed discontinuously from the battery case 103. Further, the pressing part 112 is configured to be slidable inward of the solid-state battery cell 101.

When biasing force is applied to the solid-state battery cell 101 by an elastic member of the separator 120 described later, the pressing part 112 can apply surface pressure to the laminate 102 more easily. In addition when the internal pressure of the solid-state battery cell 101 increases, the stress can be released and the safety can be improved.

A gap is formed between adjacent solid-state battery cells 101 by the pressing parts 112.

The separator 120 including the gap 111 is disposed in the gap.

The positive electrode tab 104 and the negative electrode tab 109 are electrically connected to a current collecting foil constituting the positive electrode layer and a current collecting foil constituting the negative electrode layer, respectively, and extend outward from an end surface of the laminate 102.

As shown in FIG. 3, the positive electrode tab 104 and the negative electrode tab 109 extend from two locations on the same end surface of the laminate 102, respectively.

The positive electrode tab 104 and the negative electrode tab 109 are not particularly limited, and are, for example, metal foils having a thickness of about 5 to 500 µm.

The positive electrode tab 104 and the negative electrode tab 109 are stored in the convex parts formed in the battery case 103.

Separator

The separator 120 is disposed between adjacent solid-state battery cells of the plurality of solid-state battery cells 101 to electrically insulate the adjacent solid-state battery cells of the plurality of solid-state battery cells 101, from each other.

The separator 120 electrically insulates the adjacent solid-state battery cells of the plurality of solid-state battery cells 101, from each other, by comprising at least partially an insulating material having an insulating property.

The separator 120 includes elastic members 123a and 123b, and applies biasing force in the stacking directions of the plurality of solid-state battery cells 101 indicated by the arrow in FIG. 1.

The separator 120 forms the gap 111 between the solid-state battery cells 101.

Figure 4:
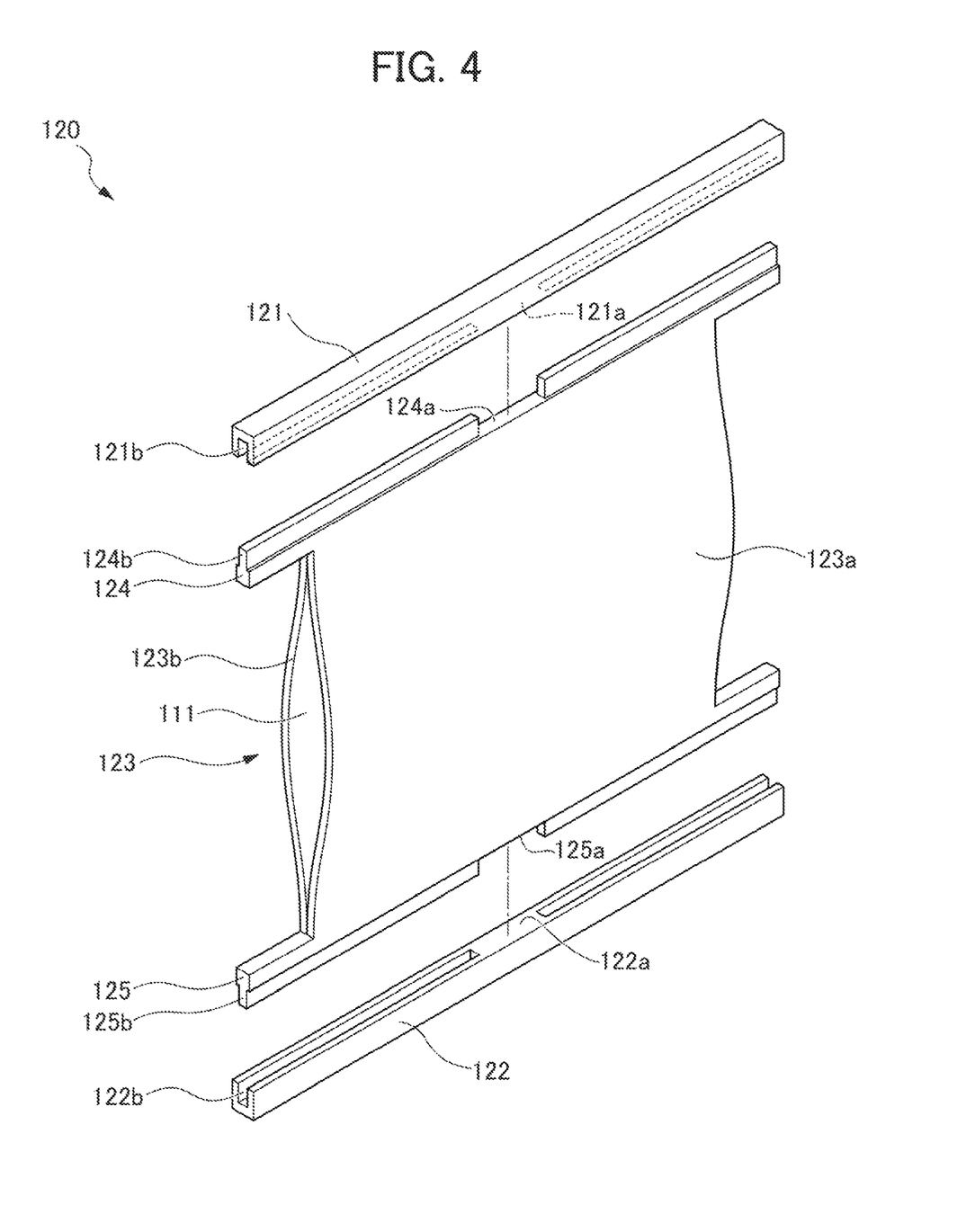
FIG. 4 is an exploded perspective view of a separator according to the embodiment of the present invention.

FIG. 4 is an exploded perspective view showing a separator 120 according to the embodiment.

As shown in FIG. 4, the separator 120 includes a body 123 and fixing parts 121 and 122 disposed above and below the body 123.

The body 123 includes the elastic members 123a and 123b. The gap 111 is formed between the elastic members 123a and 123b. The configuration of the elastic members 123a and 123b is not particularly limited, and the elastic members are, for example, a pair of plate spring-like members.

The elastic members 123a and 123b are made of an elastically deformable material.

Examples of the material include metal, ceramic, and resin material. The elastic members 123a and 123b are disposed so as to apply biasing force in the stacking directions of the solid-state battery cells 101 indicated by the arrow in FIG. 1.

For example, the body 123 is configured such that the direction in which biasing force is applied by the elastic member 123a and the direction in which biasing force is applied by the elastic member 123b are opposed to each other and the resistance is balanced.

This configuration allows biasing force to be applied to both of the solid-state battery cells 101 adjacent to the separator 120.

The elastic members 123a and 123b apply surface pressure to the laminates 102 through the pressing parts 112.

The stacking directions of the solid-state battery cells 101 shown by the arrow in FIG. 1 are the same as the laminating directions of the laminate 102 including the positive electrode layer, the negative electrode layer, and the solid electrolyte layer shown by the arrow in FIG. 2.

Accordingly, the separator 120 including the elastic members 123a and 123b applies biasing force between the solid-state battery cells 101, thereby applying surface pressure in the laminating directions of the laminates 102 through the pressing parts 112.

The gap 111 is formed between the solid-state battery cells 101 by the separator 120.

Figure 5:
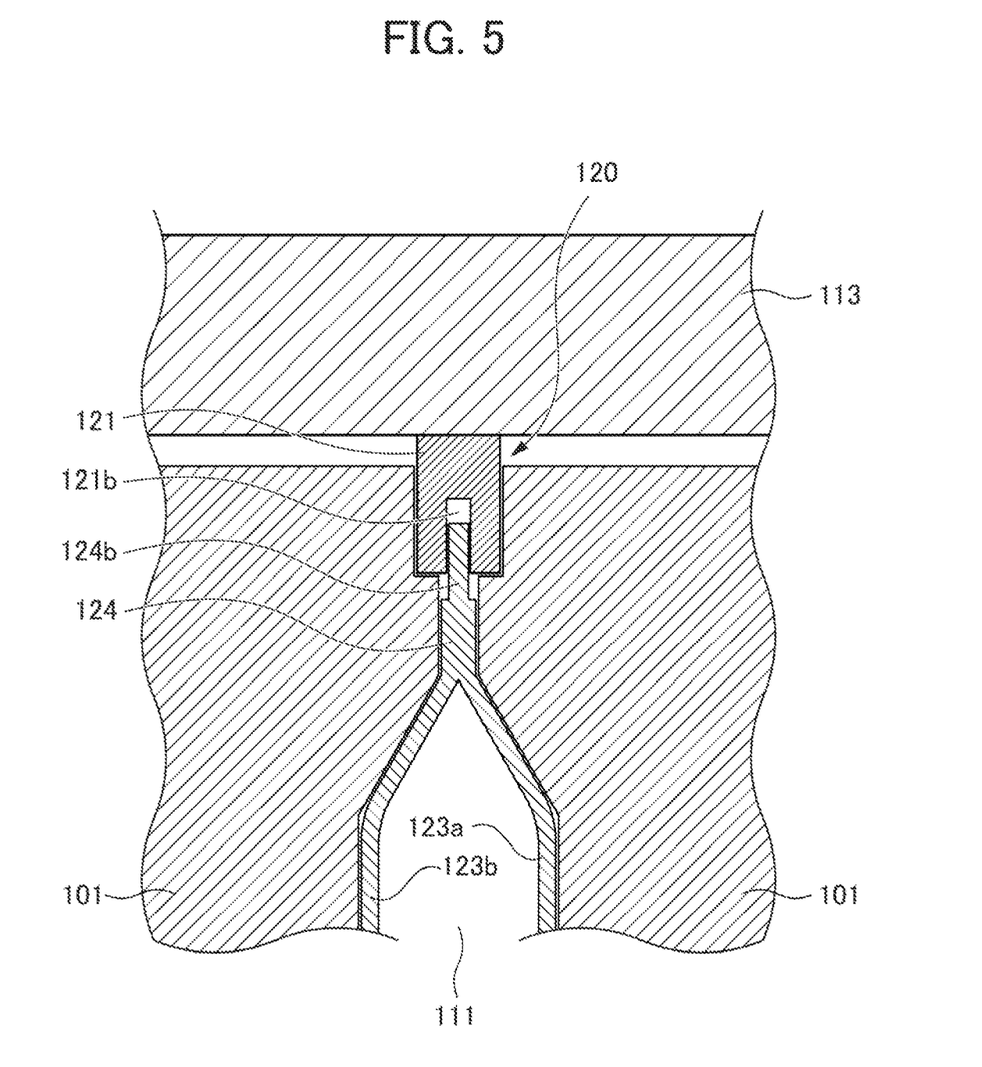
FIG. 5 is a cross-sectional view of the solid-state battery module according to the embodiment of the present invention.

As shown in FIGS. 4 and 5, the gap 111 is formed between the elastic member 123a and the elastic member 123b, for example.

At least any one of a fluid such as air or water, a heat transfer material, a heater, etc., to control the temperature rise of the solid-state battery cell 101, can be disposed in the gap 111. As a result, a preferable beat dissipation property of the solid-state battery module 100 can be obtained.

In addition to the above, at least any one of an electrical insulating material, an electrical conductive material, a buffer material, a battery case fixing member, etc., to make the solid-state battery module 100 function, may be disposed in the gap 111.

On top of the body 123, an engaging part 124 is provided, which engages with the fixing part 121.

FIG. 5 is a cross-sectional view showing a vicinity of the top of the separator 120 disposed in the solid-state battery module 100.

As shown in FIG. 5, the elastic members 123a and 123b in the body 123 are coupled to the engaging part 124 at the top. A convex part 124b is formed at the upper end of the engaging part 124.

The fixing part 121 is disposed on top of the engaging part 124.

The fixing part 121 is a member engageable with the engaging part 124 provided at the upper end of the body 123. The fixing part 121 engages with the engaging part 124 to regulate the movement of the body 123 in the horizontal and vertical directions by a predetermined amount or more.

As shown in FIG. 4, the fixing part 121 is a member having a substantially rectangular parallelepiped shape disposed along the upper end of the body 123.

The fixing part 121 includes an engaging part 121a and a concave part 121b.

The engaging part 121a is formed at any location in the longitudinal direction of the fixing part 121.

The engaging part 121a engages with a concave part 124a, which will be described later, and regulates the movement of the body 123.

More specifically, the engaging part 121a regulates the movement of the body 123 in the horizontal direction orthogonal to the stacking directions shown in FIG. 3 in a state where the separator 120 is disposed between the solid-state battery cells 101.

The concave part 121b is formed in a concave shape along the longitudinal direction of the fixing part 121.

The concave part 121b is engaged with the convex part 124b to be described later, to restrict the movement of the body 123 in the vertical direction.

The direction in which the concave part 121b opens and the direction in which the engaging part 121a is provided are the same.

The engaging part 121a and the concave part 121b are disposed toward the body 123 side so as to be engageable with the concave part 124a and the convex part 124b to be described later.

A fixing part 122 is a member engageable with an engaging pact 125 provided at the lower end of the body 123.

The fixing part 122 and the engaging part 125 have a vertically symmetrical structure with the fixing part 121 and the engaging part 124 described above.

Since the bottom of the separator 120 is in contact with the lower plate 115, the separator 120 does not protrude downward due to expansion of the solid-state battery cell 101 or other factors. Therefore, the separator 120 may be configured by providing only the fixing part 121 and the engaging part 124 without providing the fixing part 122 and the engaging part 125.

As shown in FIG. 5, the fixing part 121 is disposed above the engaging part 124.

The fixing part 121 is disposed so that the concave part 121b is engageable with the convex part 124b.

As shown in FIG. 5, the fixing part 121 and the body 123 are disposed so that a certain amount of space is formed between the concave part 121b and the convex part 124b.

That is, the fixing part 121 is disposed so as to allow a predetermined amount of upward movement of the body 123.

This allows excessive biasing force to be released upward even if, for example, the solid-state battery cell 101 expands and the gap 111 becomes narrower.

In addition to the above, since the upward movement of the body 123 by a predetermined amount or more is regulated, it is possible to prevent the separator 120 from protruding upward with respect to the solid-state battery cell 101 and losing the biasing force applied between the solid-state battery ceils 101.

Further, when vibration is applied to the solid-state battery module 100, a predetermined amount of upward movement of the body 123 is permitted, and movement of a predetermined amount or more is regulated, so that preferable vibration resistance of the solid-state battery module 100 can be obtained.

The space between the concave part 121*b* and the convex part 124*b* is preferably adjusted so that the biasing force by the elastic members 123*a* and 123*b* falls within an appropriate range.

It is preferable that the engaging part 121*a* and the concave part 124*a* are configured such that, similarly to the concave part 121*b* and the convex part 124*b*, the movement of the body 123 in the horizontal direction by a predetermined amount is permitted and the movement of the body 123 by a predetermined amount or more is regulated.

For example, the length of the engaging part 121*a* in the longitudinal direction may be configured to be shorter than the length of the concave part 124*a* in the longitudinal direction.

Module Constituent Member

The module constituent member 110 is a member constituting the solid-state battery module 100, and is disposed at the top of the plurality of solid-state battery cells 101.

The module constituent member 110 includes, for example, a bus bar 106, a voltage detection line 107, and the thermistor 108.

The module constituent member 110 may include a harness, a battery case fixing member, a cell voltage and temperature monitor unit, or the like, in addition to the above.

The module constituent member 110 is not particularly limited, and a known constituent member used in common battery modules is used.

As shown in FIG. 3, the module constituent member 110 may be disposed in concave parts formed in the battery case 103.

This can reduce the volume of the solid-state battery module 100 and increase the energy density.

In addition, it is possible to prevent the solid-state battery cell 101 from being displaced or delaminating due to vibration or the like.

Other Constituent Member

As shown in FIG. 1, the top surface of the solid-state battery module 100 is covered with the top cover 113.

The bind bars 114 are disposed at both ends of the plurality of solid-state battery cells 101.

The bind bars 114 can enhance the cohesiveness of the plurality of solid-state battery cells 101 and can fix the battery cells to the lower plate 115.

In the solid-state battery module 100 according to the embodiment, since biasing force is applied between adjacent solid-state battery cells of the plurality of solid-state battery cells 101 by the separators 120, end plates for applying surface pressure to the plurality of solid-state battery cells are not disposed.

However, end plates may be disposed to constitute the solid-state battery module.

The lower plate 115 constitutes the bottom of the solid-state battery module 100.

Since the solid-state battery module 100 according to the embodiment has a preferable heat dissipation property by the separator 120, the lower plate 115 does not include a feature for cooling the solid-state battery cell 101.

However, depending on the application, a heat conductive material such as a silicon compound may be disposed between the lower plate 115 and the solid-state battery cell 101, or cooling water may be disposed in the lower plate or below the lower plate to constitute the solid-state battery module.

Further, a buffer material may be disposed in the lower plate 115 to constitute the solid-state battery module 100.

Thus, the vibration resistance of the solid-state battery module 100 can be improved.

According to the separator 120 and the solid-state battery module 100 of the embodiment, the following effects are achieved.

The separator 120 disposed between adjacent solid-state battery cells 101 in the solid-state battery module 100 including the plurality of solid-state battery cells 101 to electrically insulate the adjacent solid-state battery cells of the plurality of the solid-state battery cells 101, from each other, includes the elastically deformable elastic members 123*a* and 123*b* which apply biasing force in the stacking directions of the plurality of solid-state battery cells 101.

Thus, it is possible to prevent the expansion of the distance between the cells due to the expansion of the solid-state battery cell 101, and to suppress influence such as stress on the module constituent member such as the bus bar 106, which leads to excellent durability. Further, since the solid-state battery cells 101 are fixed by the elastic members, the influence of vibration is reduced, and the solid-state battery cells 101 can be adequately fixed.

The separator 120 forms the gap 111 between adjacent solid-state battery cells of the plurality of solid-state battery cells 101.

As a result, a member or the like for suppressing the temperature rise of the solid-state battery cell 101 can be disposed in the gap 111, so that a preferable cooling effect of the solid-state battery cell 101 can be obtained.

The separator 120 includes the fixing part 121, which regulates the movement of the body 123 by a predetermined amount or more, above the body 123 including the elastic members 123*a* and 123*b*.

This allows for a certain amount of elastic deformation of the separator 120, and can prevent the separator 120 from protruding upward.

Therefore, the vibration resistance and durability of the solid-state battery module 100 cars be maintained.

In the solid-state battery module 100, the laminating directions of the laminate 102 of the solid-state battery cell 101 and the stacking directions of the plurality of solid-state battery cells 101 are set to be the same direction.

Thus, surface pressure can be applied to the laminate 102 by the separator 120, and the input-output characteristics and vibration resistance of the solid-state battery can be improved.

In the solid-state battery module 100, the solid-state battery cell 101 includes the pressing part 112 that applies surface pressure to a surface substantially perpendicular to the laminating directions of the laminate 102.

Thus, the biasing force applied by the separator 120 can be applied to the laminate 102 through the pressing part 112, which can preferably improve the input-output characteristics and vibration resistance of the solid-state battery.

Another Embodiment

Figure 6:
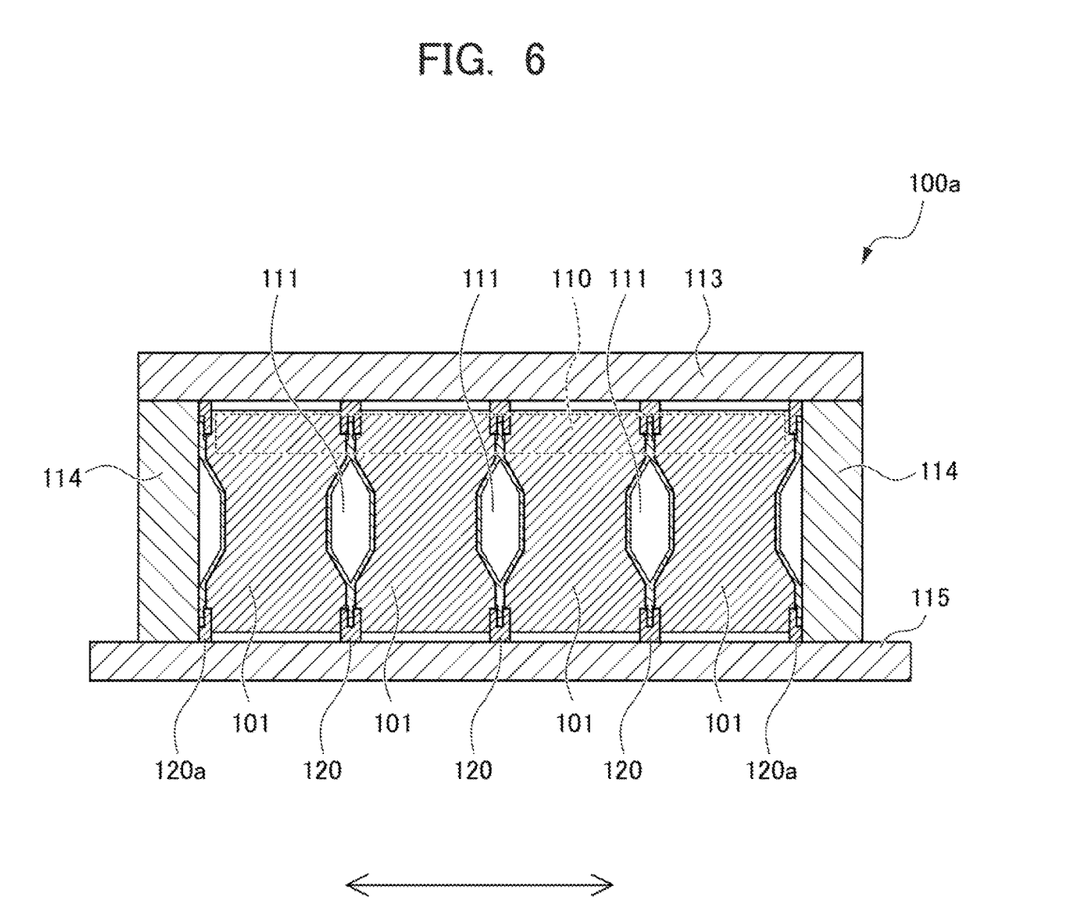
FIG. 6 is a cross-sectional view of a solid-state battery module according to another embodiment of the present invention.

FIG. 6 is a cross-sectional view showing the configuration of a solid-state battery module 100a according to another embodiment of the present invention.

As shown in FIG. 6, in the solid-state battery module 100a, bind bars 114 are disposed at both ends of a plurality of solid-state battery cells 101.

An end separator 120a is disposed between each end of the plurality of solid-state battery cells 101 and the bind bar 114. Instead of the bind bars 114, end plates may be disposed at both ends of the plurality of solid-state battery cells 101. The features of the solid-state battery module 100a other than the above may be the same as those of the solid-state battery module 100.

The end separator 120a includes an elastically deformable elastic member, and applies biasing force in a stacking direction of the plurality of solid-state battery cells 101 illustrated by an arrow in FIG. 6.

As shown in FIG. 6, for example, the end separator 120a has a configuration in which the separator 120 according to the above embodiment is divided into two in the vertical direction.

The end separator 120a includes, for example, one plate spring-like elastic member as the body, and applies biasing force to the adjacent solid-state battery cell 101.

In addition, the end separator 120a includes a fixing part at least at the top of the separator, and the movement of the body in at least one of the vertical direction and the horizontal direction is regulated. The features of the end separator 120a other than the above may be the same as those of the separator 120.

According to the solid-state battery module 100a of the embodiment, the following effects can be achieved.

In the solid-state battery module 100a, the end separators 120a are disposed at both ends of the plurality of solid-state battery cells 101.

The end separators 120a apply biasing force in the stacking directions of the plurality of solid-state battery cells 101.

Therefore, the input-output characteristics and vibration resistance of the solid-state battery can be more preferably improved.

As described above, preferable embodiments of the present invention have been described.

However, the present invention is not limited to the above embodiments, and can be modified as appropriate.

In the above embodiments, the elastic members included in the separator 120 are described as the elastic members 123a and 123b which are a pair of plate spring-like members, but the present invention is not limited to the above. The elastic members of the separator 120 may be any member capable of applying biasing force to the adjacent solid-state battery cells 101. Further, the elastic members are not limited to a pair of elastic members that apply biasing force in both opposing directions of the stacking directions of the adjacent solid-state battery cells 101. The elastic members may apply biasing force to only one of the stacking directions of the adjacent solid-state battery cells 101. Alternatively, separators 120 that apply biasing force in one of the stacking directions of the solid-state battery cells 101 and separators 120 that apply biasing force in the opposing stacking direction may be alternately provided.

EXPLANATION OF REFERENCE NUMERALS 100, 100a solid-state battery module
101 solid-state battery cell
102 laminate
111 gap
112 pressing part
120 separator
120a end separator
121 fixing part
123 body
123a elastic member
123b elastic member

What is claimed is:

1. A separator disposed between adjacent solid-state battery cells in a solid-state battery module comprising a plurality of solid-state battery cells to electrically insulate the adjacent solid-state battery cells of the plurality of solid-state battery cells, from each other,
   each of the plurality of solid-state battery cells comprising a laminate comprising a positive electrode layer, a negative electrode layer, and a solid electrolyte layer present between the positive electrode layer and the negative electrode layer,
   the separator forming a gap between the adjacent solid-state battery cells,
   the separator comprising a pair of plate spring-like members, the pair of plate spring-like members being an elastically deformable elastic member which applies biasing force in a stacking direction of the plurality of solid-state battery cells, the gap being formed between the pair of plate spring-like members, and
   elastically deformable surfaces of the pair of plate spring-like members being arranged to face stacked surfaces of the plurality of solid-state battery cells,
   wherein the separator comprises a body and a fixing part comprising a concave part, wherein a convex part is formed at an end of the body, wherein the concave part is engaged with the convex part to restrict the movement of the body, wherein the fixing part and the body are disposed so that an amount of space is formed between the concave part of the fixing part and the convex part of the body.

2. The separator according to claim 1,
   wherein the fixing part is disposed at least above the body, and
   wherein the fixing part is configured to regulate movement of the body by a predetermined amount or more.

3. A solid-state battery module comprising the separator according to claim 2,
   wherein each of the plurality of solid-state battery cells comprises a laminate comprising a positive electrode layer, a negative electrode layer, and a solid electrolyte layer present between the positive electrode layer and the negative electrode layer, and
   wherein a laminating direction of the laminate and the stacking direction of the plurality of solid-state battery cells are the same.

4. A solid-state battery module comprising the separator according to claim 1,
   wherein each of the plurality of solid-state battery cells comprises a laminate comprising a positive electrode layer, a negative electrode layer, and a solid electrolyte layer present between the positive electrode layer and the negative electrode layer, and wherein a laminating direction of the laminate and the stacking direction of the plurality of solid-state battery cells are the same.

5. The solid-state battery module according to claim 4, wherein the plurality of solid-state battery cells comprises a pressing part that applies surface pressure to a surface substantially perpendicular to the laminating direction of the laminate.

6. The solid-state battery module according to claim 5, wherein bind bars or end plates are disposed at both ends of the plurality of solid-state battery cells, and wherein an end separator comprising an elastically deformable elastic member which applies biasing force in the stacking direction of the plurality of solid-state battery cells is disposed between each end of the plurality of solid-state battery cells and the bind bar or the end plate.

7. The solid-state battery module according to claim 4, wherein bind bars or end plates are disposed at both ends of the plurality of solid-state battery cells, and wherein an end separator comprising an elastically deformable elastic member which applies biasing force in the stacking direction of the plurality of solid-state battery cells is disposed between each end of the plurality of solid-state battery cells and the bind bar or the end plate.

8. A separator disposed between adjacent solid-state battery cells in a solid-state battery module comprising a plurality of solid-state battery cells to electrically insulate the adjacent solid-state battery cells of the plurality of solid-state battery cells, from each other, the separator comprising a body comprising an elastically deformable elastic member which applies biasing force in a stacking direction of the plurality of solid-state battery cells, and a fixing part, wherein the fixing part comprising a concave part, wherein a convex part is formed at an end of the body, wherein the concave part is engaged with the convex part to restrict the movement of the body, wherein the fixing part and the body are disposed so that an amount of space is formed between the concave part of the fixing part and the convex part of the body, the fixing part being disposed at least above the body, and the fixing part being configured to regulate movement of the body by a predetermined amount or more in a vertical direction that is a direction orthogonal to the stacking direction and being disposed so as to allow a predetermined amount of upward movement of the body.

* * * * *